Sept. 8, 1959

C. H. YOUNG 2,903,111

IMPACT CLUTCH FOR POWER WRENCHES OR THE LIKE

Filed May 22, 1956

INVENTOR.
CHARLES H. YOUNG
BY
Brennan B. West
ATTORNEY

Sept. 8, 1959  C. H. YOUNG  2,903,111
IMPACT CLUTCH FOR POWER WRENCHES OR THE LIKE
Filed May 22, 1956  2 Sheets-Sheet 2

INVENTOR.
CHARLES H. YOUNG
BY
ATTORNEY

United States Patent Office 2,903,111
Patented Sept. 8, 1959

2,903,111
IMPACT CLUTCH FOR POWER WRENCHES OR THE LIKE

Charles H. Young, North Royalton, Ohio, assignor to Master Pneumatic Tool Company, Inc., Bedford, Ohio, a corporation of Ohio Application May 22, 1956, Serial No. 586,542

9 Claims. (Cl. 192—30.5)

This invention is an improved impact clutch for incorporation in rotary power wrenches or the like, particularly those driven by motors that are operated by compression air or similar pressure fluid, advantage being taken of the elasticity of the fluid to enhance the action of the clutch.

Tools of this class are used for running down and tightening nuts and bolts and for driving screws, as well as for loosening and removing such objects by reverse action of the tool. Attachments in the form of sockets are applied to the shank of the tool for use with nuts and bolts, while other attachments of appropriate character are employed in place of the former ones when screws having slotted or recessed heads are to be operated upon. In view of this diversity, I shall, for convenience, apply the term "work" to the objects operated upon and the term "adapter" to the attachments.

Among the objects of my invention are to provide an impact clutch that is highly efficient and reliable; to provide a construction that is relatively simple and is economical of production; and to provide an impact clutch that is strong, durable in service, and convenient of assembly and disassembly, thus expediting manufacture and facilitating inspection and servicing.

The foregoing objects and advantages, with others that will appear as this description proceeds, are attained in the embodiment of the invention illustrated in the accompanying drawings, although it is to be understood that the invention is not limited to the details disclosed herein further than is required by the terms of the appended claims.

In the drawings, wherein like parts are designated by like reference characters throughout the several views, Fig. 1 is a side elevational view, partly in section, of a rotary power tool incorporating my improved impact clutch;

Figure 1:
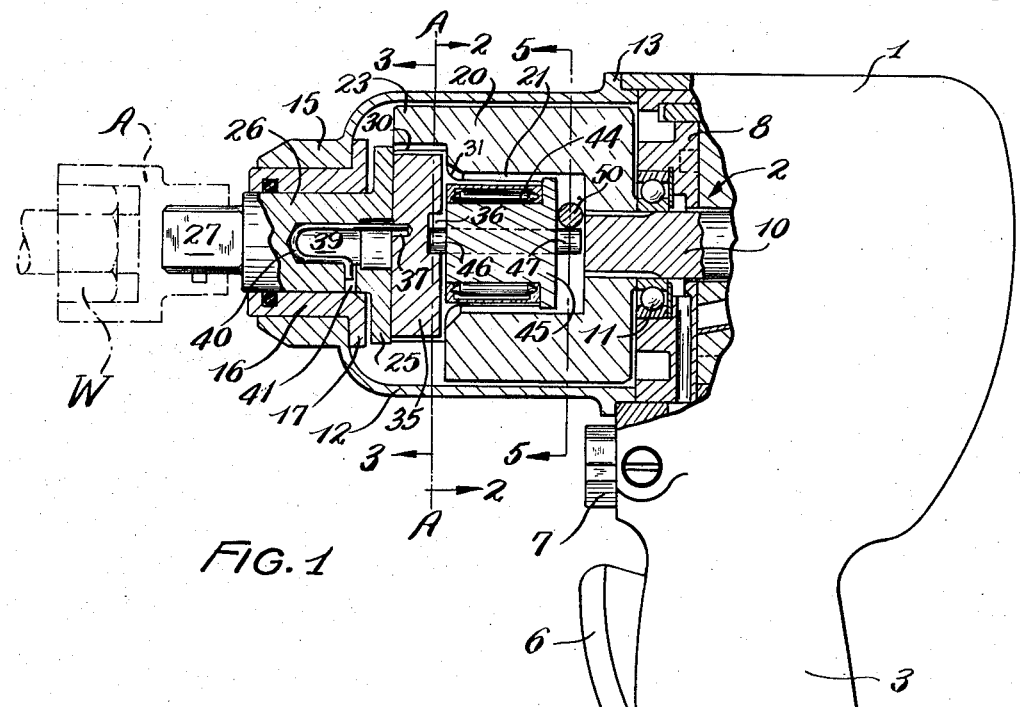

1 denotes a motor housing that encloses the working parts of a pressure fluid motor, desirably pneumatic, designated generally by the reference numeral 2. The motor of itself constitutes no part of my invention and may be of conventional design. The housing 1 incorporates a handle 3 by which the tool may be grasped, and pressure fluid, such as compressed air, is delivered to the motor by a conduit 4 that is shown as connected to the lower end of the handle, alongside an oiler 5. The delivery of pressure fluid to the motor is controlled by a valve concealed within the handle and having an operating trigger 6. The motor includes a conventional reversing valve that is actuated by an indicator-handle 7. An end plate 8 is disposed within the open forward end of the housing 1, and extending through a central aperture thereof is a rotary driving element, presently constituted of the motor shaft 10, an anti-friction bearing 11 being interposed between the shaft and the surrounding portion of said plate.

Figure 2:
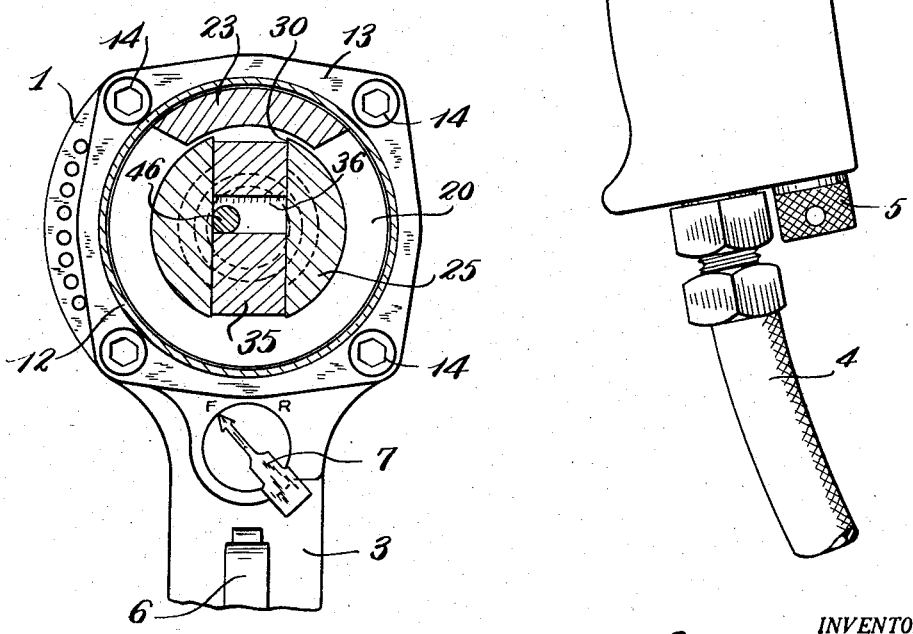
Fig. 2 is a fragmentary sectional front elevation of the tool, the plane of section being indicated by the line A—A and the view being taken as though looking in the direction of the arrows 2, 2.

12 denotes a generally cylindrical clutch casing that is surrounded, near its rear open end, by a flange 13. The casing is arranged with said end projected into the motor housing, and is held to the housing by fastening means or screws 14 that extend through apertures of the flange 13 (Fig. 2). The end of the casing 12 remote from the housing 1 is reduced in diameter and terminates in a hollow boss 15 that is fitted with a bushing 16 having a peripheral flange 17 at its inner end that engages the inner side of the front wall of the casing.

Splined, or otherwise secured against rotation, to the forward end of the motor shaft 10 is the driving member or hammer 20 of the clutch. This member is shown as a cylindrical body having a relatively large axial recess 21 that opens through its forward end, and aligned with said recess is an aperture of appropriate size and shape to receive the forward end of the motor shaft. Extending in an axial direction from the front end of the driving member or hammer 20 adjacent the periphery thereof is an abutment or segmental lug 23, each approximately radial side of which, in the present construction, provides an impact surface or abutment that is spaced outwardly from the axis of rotation of the driving member or hammer.

Figure 6:
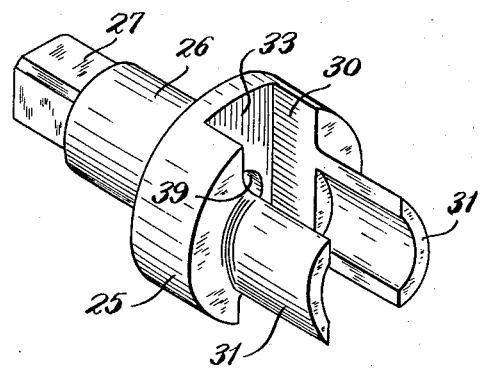
Fig. 6 is a perspective view of the driven clutch member that incorporates the shank to which adapters may be attached.

The driven member of the clutch is designated 25, and it is shown in perspective in Fig. 6. Extending forwardly from its relatively large cylindrical body portion is a part 26 that is journaled in the previously mentioned bushing 16, and said part terminates at its forward end in a shank 27, shown as square, and to which may be applied an adapter A for holding engagement with the work designated W. In the present instance, the adapter is a socket and the work consists of a bolt. Obviously, the shank 27 may be of any shape other than circular in cross section, or it may be provided with means for interlocking engagement with the adapter, so long as the adapter is held against turning with respect to the shank. The body portion of the member 25 is provided with a diametrical guideway 30, and the same opens rearwardly through an extension of the member that is composed of two arcuate walls 31, as best shown in Fig. 6. The inner and outer surfaces of these walls are concentric with the rotating axis of the member 25 and they project into the recess 21 of the driving member or hammer 20. When the parts are in assembled relation, the rear face of the body portion of the member 25 is closely adjacent to or in contact with the front face of the driving member or hammer for a slight distance outwardly of the flared front end of the recess 21. The guideway 30 is defined by flat parallel side walls and a flat connecting wall 33 that is at right angles to the side walls, and reciprocable in the guideway is an impact device or anvil 35 in the form of a rectangular block. The impact device or anvil is no greater, and desirably is slightly less, in length than the side walls of the guideway, and it is provided on its rear side with a transverse groove 36, and on its front side with an aperture 37. An axial recess 39, shown as counterbored at its rear end, is formed in the driven clutch member 25 and opens through the wall 33 of the guideway 30. This recess contains a spring 40 of the hairpin type, one end of which is deflected and engaged within a hole 41, thereby to retain the spring in position. The opposite end of the spring extends beyond the wall 33 and occupies the aperture 37 of the anvil 35. The spring tends to hold the anvil 35 in fully retracted position entirely within the guideway 30.

Figure 3:
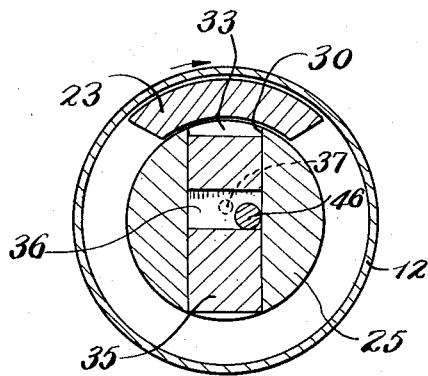
Fig. 3 is also a section on the line A—A of Fig. 1, but looking in the direction of the arrows 3, 3, and showing the anvil in retracted position.

Supported for free rotation within an anti-friction or needle bearing 44, between the arcuate walls 31 of the driven clutch member 25, is an actuator 45. As clearly appears from the drawings, the driving and driven clutch members, and the actuator 45, rotate about a common axis, and a forward projection 46 of the actuator, that is eccentric with respect to the aforesaid axis, extends into the groove 36 of the anvil 35, for cooperation with the bottom wall of the groove (considering the parts as positioned in the drawings) under conditions, and in a manner presently to be described. The projection 46 normally engages said wall a substantial distance to one side of the aforesaid axis, or, in other words, to one side of a central plane parallel with and midway between the sides of the anvil 35, as shown in Figs. 2 and 3. A projection 47, also eccentric with respect to said axis, extends from the rear end of the actuator within the path of a transverse pin 50 that is carried by the driving member or hammer 20 and extends across the recess 21 adjacent the inner end thereof and is offset a distance from the axis of the driving member or hammer. The projections 46 and 47 are in axial alignment with each other and, incidentally, are constituted of the ends of a pin that occupies a bore of the actuator 45. The projection 47 and pin 50 provide a driving connection between the driving member or hammer and the actuator. The actuator 45, however, is free to overrun the driving member or hammer 20 through less than one revolution in either direction of rotation, and to rotate projection 47 ahead of its engagement with the pin 50, thereby releasing the driving connection. In other words, by reason of this manner of cooperation between the projection 47 and the pin 50, there is a so-called lost-motion driving connection between the driving member and the actuator.

Figure 4:
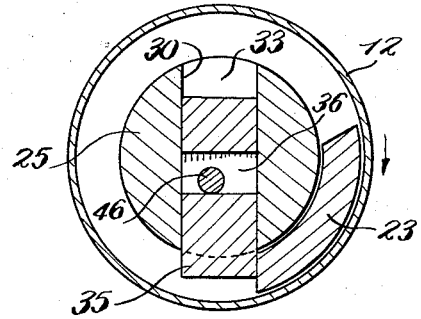
Fig. 4 is a view, similar to Fig. 3, showing the anvil in projected position.
Figure 5:
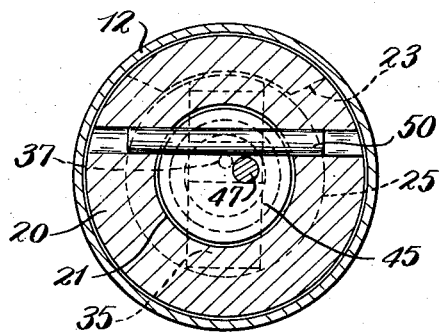
Fig. 5 is a section on the line 5—5 of Fig. 1.

In considering the operation of the tool, it will be assumed that the bolt that constitutes the work W has a right hand thread and is to be run down and tightened. With the indicator-lever 7 set for forward drive, as indicated by the letter F on the motor housing (Fig. 2), under which circumstances the motor rotates in a clockwise direction the operator grasps the tool by the handle 3 and engages the adapter A with the work W and squeezes the trigger 6. This starts the motor and causes it, through its shaft 10, to whirl the driving member or hammer 20 in the direction indicated by the arrows in Figs. 3 and 4. Engagement of the cross pin 50 with the projection 47 causes the actuator 45 to rotate with the driving member or hammer. As long as the work rotates with comparative ease as during the running down period, the spring 40 retains the slide or anvil 35 in fully or partially retracted position, and the projection 46 of the actuator, engaging the bottom wall of the groove 36 on the side of the aforesaid central plane whereon it is shown in Figs. 2 and 3, transmits rotation of the driving member or hammer, through the intervention of the actuator and anvil, to the driven member 25, causing the latter to spin the adapter A and, in turn, the work W at substantially motor speed.

The driving torque is transmitted to the adaptor A by the camming action of the projection 46 engaging the bottom wall of the groove 36 and tending to move the anvil 35 radially outward into the path of the lug 23 against the force of the spring 40, which tends to hold the anvil 35 in retracted position. As long as the torque resistance is less than the force of the spring 40 the free running down action continues, the lug or abutment 23 of the driving member and the driven member 25 occupying relative positions some place between that shown in Fig. 3, in which the anvil 35 is held in fully retracted position by the spring 40, and that shown in Fig. 4, in which the torque resistance has exceeded the force of the spring 40 and the projection 46 has moved in its orbital path past the point of maximum advance or projection of the anvil 35.

When the torque resistance overcomes the spring 40, the center of the projection 46 passes through the aforesaid central plane parallel with and midway between the sides of the anvil 35, at which point the anvil 35 has been cammed radially outward to its fully advanced position. The torque resistance has decelerated or stopped the rotation of the driven member. The driving member, at this dead center point, is free of the torque load previously transmitted by the spring. At this dead center point the lug or abutment 23 of the hammer has not yet reached the angular position shown in Fig. 4, but is spaced circumferentially from the adjacent abutment face of the anvil 35 by an angle equal to the lead of the projection 46 with respect to the lug 23. As soon as the projection 46 has passed through the aforesaid central plane of the anvil 35 the spring 40 acts in a direction to retract the anvil 35 and exert a small but increasing component of force on the projection 46 tending to accelerate the rotation of the actuator 45 and advance the projection 47 ahead of its abutting engagement with the transverse pin 50. However, the motor torque continues to accelerate the hammer 20 in the same direction and to maintain the transverse pin 50 in abutting engagement with the pin 47. Thus the anvil 35 can retract from its fully advanced position only to the position shown in Fig. 4 when it is struck by the lug 23 and the momentum of the hammer 20 is delivered to the driven member 25.

At the instant of impact the hammer member 20 carrying the transverse pin 50 is rapidly decelerated, permitting the actuator 45 to continue its forward rotation, and thereby allowing the projection 47 to advance ahead of its engagement with the transverse pin 50 and move the projection 46 further along its orbital path and out of engagement with the bottom wall of the groove 36.

This relation and operation are maintained through the full range of operating speeds and conditions. Under all operating conditions the lug 23 strikes a full solid blow against the side of the anvil which is either in the position shown in Fig. 4, in its fully advanced position, or in some position intermediate those two.

While the energy of the hammer is being delivered to the driven member 25 during the impact blow the high pressure of the lug 23 against the anvil 35 prevents the spring 40 from retracting the anvil 35 further, even if the actuator 45 continues to rotate and runs ahead of the hammer member 20. As soon as the energy of the hammer has been delivered to the driven member the high pressure and consequent friction between the lug 23 and the anvil 35 diminishes. At this point the hammer member 20 may rebound, or turn a short distance in the opposite direction to that in which it is being urged by the motor torque. In any event, when the high pressure of the impact blow has ceased, the spring 40 moves the anvil 35 into its fully retracted position, moving the projection 47 on the actuator 45 farther ahead of the driving pin 50. As soon as the anvil 35 is fully retracted the lug 23 is free to rotate past the end of the anvil 35 and the motor torque again accelerates the hammer member 20, again advancing the lug 23 around to the position illustrated in Fig. 3. During this acceleration of the hammer the transverse pin 50 again catches up with the projection 47 on the actuator 45 so that the projection 46 again starts to cam the anvil 35 outwardly against the force of the spring 40. The impact action then continues, the hammer 20 being accelerated by the motor and striking an impact blow against the adjacent side of the projected anvil 35 each revolution until the successive blows have tightened the work to the desired extent. The operator then releases the trigger 6 to stop the motor.

Obviously, by swinging the indicator-lever 7 to its opposite position, the motor may be caused to rotate the clutch in the opposite direction to that in which it was previously rotated and the operation above described may be carried out in reverse order for loosening and retracting the work.

This reverse action of the impact clutch results from the fact that all coacting parts thereof are substantially symmetrical on both sides of a central longitudinal plane of the clutch.

Having thus described my invention, what I claim is:

1. An impact clutch for power wrenches or the like of the kind incorporating a rotary driving element; said clutch comprising a driving member that is operatively connected to said element so as to be rotated thereby about an axis, a driven member supported adjacent to the driving member for rotation about the same axis, one of said members being provided with an abutment spaced radially from said axis, an impact device guided with respect to the other member for movement substantially radially thereof between a projected position wherein one of its ends is in the orbital path of said abutment and a retracted position wherein said end is inwardly of said path, resilient means tending to retain said impact device in retracted position, and a releasable operative connection between said device and the member provided with said abutment and which responds to relative rotation between the members to shift the device to projected position and thereafter to release said device to the retracting influence of the aforesaid resilient means.

2. An impact clutch for power wrenches or the like of the kind operated by a motor driven by elastic pressure fluid and incorporating a rotary driving element; said clutch comprising a driving member operatively connected to said element so as to be rotated thereby about an axis, a driven member supported adjacent to the driving member for rotation about the same axis, one of said members being provided with an abutment spaced radially from said axis, an impact device guided with respect to the other member for movement substantially radially thereof between a projected position wherein one of its ends is in the orbital path of said abutment and a retracted position wherein said end is inwardly of said path, resilient means tending to retain said device in retracted position, and a releasable driving connection, characterized by camming action upon said impact device, between the device and the member provided with said abutment and which responds to relative rotation between the members to shift the impact device to projected position and thereafter to release said device to the retracting influence of the aforesaid resilient means.

3. An impact clutch for power wrenches or the like of the kind incorporating a rotary driving element; said clutch comprising a driving member that is operatively connected to said element so as to be rotated thereby about an axis, a driven member supported adjacent the driving member for rotation about the same axis, one of said members being provided with an abutment spaced radially from said axis, an impact device guided with respect to the other member for movement radially thereof between a projected position, wherein one of its ends is in the orbital path of said abutment, and a retracted position, wherein said end is inwardly of said path, resilient means tending to retain said device in retracted position, and an actuator rotatable about the aforesaid axis and having a driving connection with the member provided with the aforesaid abutment that permits limited relative rotation between said member and the actuator, the actuator including an eccentric part, and the impact device having a part presenting a surface substantially normal to the direction of movement of the device, said eccentric part being arranged to traverse said surface and because of its eccentric path of travel impart movement to the impact device in opposition to the retracting influence of said resilient means, whereby the driving member, through the intervention of said actuator and impact device, rotates the driven member and, when the torque resistance of the driven member substantially exceeds the retracting power of the aforesaid resilient means, said eccentric part transverses said surface and momentarily projects the impact device with its aforesaid end in the path of said abutment so as to receive the impact of the latter.

4. An impact clutch for power wrenches or the like of the kind incorporating a rotary driving element; said clutch comprising a driving member supported for rotation about an axis and having operative connection with said element, said driving element having an abutment in radially spaced relation to said axis, a driven member mounted adjacent to the driving member for rotation about the same axis, an anvil slidably supported by the driven member for movement radially of said axis between a projected position wherein one of its ends is in the orbital path of said abutment and a retracted position wherein said end is inwardly of said path, a spring disposed between parts respectively on the driven member and anvil and tending to retain the latter in retracted position, and an actuator having driving connection with the driving member that permits limited relative rotation between said driving member and the actuator, said actuator having, also, an eccentric driving connection with the anvil which latter connection becomes ineffective after the anvil assumes fully projected position, whereby the driven member is rotated by the driving member at substantially the speed of the latter until the torque resistance of the driven member sufficiently exceeds the retracting power of the aforesaid spring to cause the anvil to be projected with said end thereof in the path of the aforesaid abutment.

5. An impact clutch for power wrenches or the like of the kind incorporating a rotary driving element; said clutch comprising a driving member operatively connected to said element so as to be rotated thereby about an axis, a driven member supported adjacent the driving member for rotation about the same axis, the driving member being provided with an abutment spaced radially from said axis, the driven member being provided with a diametrical guideway, an anvil reciprocable in said guideway between a projected position wherein one of its ends is in the orbital path of said abutment and a retracted position wherein said end is inwardly of said path, a spring interposed between parts respectively on the anvil and the driven member and tending to retain the anvil in retracted position, an actuator rotatable about the aforesaid axis, the anvil having a transverse groove on the side thereof adjacent the actuator and the actuator being provided with an eccentric projection that extends into said groove, said projection being disposed a substantial distance to one side of the aforesaid axis when the anvil is in retracted position and swinging through a plane longitudinally of the anvil and coincident with said axis as the anvil assumes fully projected position, and a driving connection between the opposite end of the actuator and the driving member that permits limited relative rotation between said member and the actuator whereby, when the driving member is rotated, it will drive the driven member through the intervention of the actuator and anvil until the torque resistance of the driven member overcomes the retracting force of the aforesaid spring and causes the anvil to be fully projected with the aforesaid end thereof in the path of said abutment so as to receive the impact thereof.

6. An impact clutch for power wrenches or the like of the kind incorporating a rotary driving element; said clutch comprising a driving member operatively connected to said element so as to be rotated thereby about an axis, a driven member supported adjacent to the driving member for rotation about the same axis, the driving member having an axially extending segmental lug adjacent its periphery, and the driven member having a diametrical guideway in the plane of the orbital path of said lug, an anvil slidable within said guideway, the anvil being movable between a projected position wherein one of its ends is in the orbital path of said lug and a retracted position wherein said end is inwardly of said path, a spring tending to retain the anvil in retracted position, the anvil having a transverse groove in its side adjacent the driving member, the driving member being provided with an axial recess opening through its end adjacent the driven member and the driven member having an extension projecting into said recess, said extension having a diametrical slot that registers with the guideway and provides opposed walls, said walls being curved on their inner sides in concentric relation to the aforesaid axis, an actuator rotatably supported by and between said walls, a projection extending from the adjacent end of the actuator into the transverse groove of the anvil and located eccentric of said axis, a propection extending from the opposite end of the actuator substantially in alignment with the former projection, a part within the bottom of said axial recess and fixed with respect to the driving member for engagement with the last mentioned projection of the actuator, said part being so related to said projection as to provide a lost-motion driving connection between the driving member and the actuator.

7. An impact clutch for power wrenches or the like of the kind incorporating a reversible pressure fluid motor including a driving element; said clutch comprising a substantially symmetrical driving member operatively connected to said element so as to be rotated thereby in either direction about an axis, said member having a central cylindrical recess that opens through its front face and being provided with a segmental lug projecting in an axial direction from said face adjacent the periphery of the member, a driven member supported for rotation about said axis and including a cylindrical body portion adjacent the front end of the driving member and provided with an axial extension that occupies said recess, the aforesaid segmental lug overlying a part of said body portion of the driven member and said body portion having a diametrical guideway within the transverse plane of said lug, an anvil slidable in said guideway and being of a length no greater than that of the guideway, a spring interposed between parts of the anvil and the driven member and tending to retain the anvil in a retracted position entirely within the guideway, the axial extension of the driven member having a diametrical slot from end to end that registers with the guideway and provides opposed walls, the inner surfaces of said walls being curved concentric to the aforesaid axis, an actuator supported by and between said walls for rotation about said axis, a projection on the front end of the actuator eccentric to the axis of the latter, the anvil having a transverse groove in its side adjacent the actuator into which said projection extends for contact with a side wall of the groove, and lost motion driving connections between the rear end of the actuator and the driving member consisting of circumferentially spaced apart abutments on one of said parts and a projection on the other for alternate engagement with the last mentioned abutments, the driven member having provisions at its forward end for the attachment of an adapter.

8. An impact clutch for power wrenches or the like of the kind operated by a reversible motor driven by elastic pressure fluid and including a driving element; said clutch comprising a substantially symmetrical driving member operatively connected to said element so as to be rotated thereby in either direction about an axis, said member having a central cylindrical recess that opens through its front face and being provided with a segmental lug projecting in an axial direction from said face adjacent the periphery of the member, a driven member supported for rotation about said axis and including a cylindrical body portion adjacent the front end of the driving member and provided with an axial extension that occupies said recess, the aforesaid segmental lug overlying a part of said body portion of the driven member and said body portion having a diametrical guideway within the transverse plane of said lug, an anvil slidable in said guideway and being of a length no greater than that of the guideway, a spring interposed between parts of the anvil and the driven member and tending to retain the anvil in a retracted position entirely within the guideway, said axial extension of the driven member having a diametrical slot from end to end that registers with the guideway and provides opposed walls, the inner surfaces of said walls being curved concentric to the aforesaid axis, an actuator supported by and between said walls for rotation about said axis, a projection on the front end of the actuator eccentric to the axis of the latter, the anvil having a transverse groove in its side adjacent the actuator into which said projection extends for contact with a side wall of the groove, a second projection in alignment with the former projection and extending from the rear end of the actuator into the bottom of the axial recess of the driving member, and a pin disposed across the bottom of the recess for engagement with the second projection, the driven member having provisions at its forward end for the attachment of an adapter.

9. An impact clutch for power wrenches or the like of the kind incorporating a rotary driving element; said clutch comprising a driving member operatively connected to said element so as to be rotated thereby about an axis, a driven member supported adjacent to the driving member for rotation about the same axis, the driving member having an axially extending segmental lug adjacent its periphery, and the driven member having a diametrical guideway in the plane of the orbital path of said lug, an anvil slidable within said guideway, the anvil being movable between a projected position wherein one of its ends is in the orbital path of said lug and a retracted position wherein said end is inwardly of said path, resilient means tending to retain the anvil in retracted position, the anvil having a transverse groove in its side nearest the driving member, the driving member being provided with an axial recess opening through its end adjacent the driven member and the driven member incorporating an extension projecting into said recess, said extension having an axial space that opens at one end into the aforesaid guideway and at its opposite end into said axial recess, an actuator supported in said space for rotation on the beforementioned axis, a projection extending from the adjacent end of the actuator into the transverse groove of the anvil and located eccentric of said axis, a driving part carried by the driving member adjacent the bottom of the axial recess of the latter, and a driven part on the contiguous end of the actuator for cooperation with the first mentioned driving part, said driving and driven parts being so related as to provide a lost motion driving connection between the driving member and the actuator.

References Cited in the file of this patent

UNITED STATES PATENTS

| 2,256,496 | Robinson | Sept. 23, 1941 |
| 2,575,523 | Mitchell | Feb. 16, 1951 |
| 2,801,718 | Kaman | Aug. 6, 1957 |